United States Patent [19]
Alden

[11] Patent Number: 5,871,101
[45] Date of Patent: Feb. 16, 1999

[54] REUSABLE SLOTTED SUSPENSION BULK PACKAGE

[75] Inventor: Polly Alden, Hudson, Mass.

[73] Assignee: Digital Equipment Corporation, Maynard, Mass.

[21] Appl. No.: 671,467

[22] Filed: Jun. 27, 1996

[51] Int. Cl.⁶ .................................................. B65D 85/00
[52] U.S. Cl. ...................... 206/724; 206/0.82; 206/583; 229/71
[58] Field of Search ................................ 229/67.1, 67.2, 229/71, 92.3, 92.8, 69, 72; 206/475, 701, 724, 0.82, 489, 583

[56] References Cited

U.S. PATENT DOCUMENTS

| | | | |
|---|---|---|---|
| 1,122,398 | 12/1914 | Jarvis | 229/71 |
| 1,127,370 | 2/1915 | Palmer | 229/67.1 X |
| 2,176,284 | 10/1939 | Whiteford | 206/425 X |
| 2,597,227 | 5/1952 | Colliton | 206/489 |
| 2,624,502 | 1/1953 | Evans | 229/71 X |
| 2,684,546 | 7/1954 | Morton | 729/71 X |
| 2,918,921 | 12/1959 | Carlston | 229/67.1 X |
| 3,194,482 | 7/1965 | Berkley | 229/71 |
| 3,195,802 | 7/1965 | Jacobs | 229/71 X |
| 3,370,781 | 2/1968 | Sroge | 229/71 |
| 3,530,918 | 9/1970 | Peebles | 229/71 X |
| 3,899,381 | 8/1975 | O'Brien et al. | 229/69 X |
| 4,477,013 | 10/1984 | Herrin | 206/583 |
| 4,852,743 | 8/1989 | Ridgeway . | |
| 4,923,065 | 5/1990 | Ridgeway . | |
| 5,071,009 | 12/1991 | Ridgeway . | |
| 5,218,510 | 6/1993 | Bradford | 206/583 X |

*Primary Examiner*—David T. Fidel

[57] ABSTRACT

A packaging system for use with irregular shaped articles is described. The system includes a carton having slotted sidewall members disposed to receive suspension folders at least one suspension folder. The suspension folder includes a layer of a packaging material having a pair of apertures and having a pair of creases disposed along a region of the layer coextensive with an edge portion of each one of the apertures. The layer is provided with a stretchable material bonded to a first surface of said layer of packaging material. A strong hinge is provided at portions of the layer disposed along the edges of the pair of apertures to join the first and second portions of the layer of packaging material.

14 Claims, 6 Drawing Sheets

REUSABLE SLOTTED SUSPENSION BULK PACKAGE

BACKGROUND OF THE INVENTION

This invention relates generally to packaging and more specifically to reusable suspension packaging of irregular shaped items.

As is known in the art, it is often necessary for irregular-shaped items to be packaged and transported over large distances during part of the manufacturing process for an article. For example, a computer system is assembled from circuit boards. Often these circuit boards are manufactured in different facilities and are transported to a computer system assembly facility. These circuits boards are generally populated with integrated circuits and often take on different sizes and shapes. They are thus transported from one manufacturing facility to the computer system assembly facility.

For circuit boards special problems arise in safely transporting these devices. In particular, the different sizes and heights of integrated circuits bonded to the circuit board and the existence of components at the outer edges of the circuit board present difficult challenges. Several approaches are possible including the use of reusable bulk packages. Most reusable bulk packages are made of rigid plastic or corrugated fiberboard which can be knocked down, i.e., taken apart and nested or shipped flat for return delivery of the packaging for their eventual reuse. One problem with many of these approaches, however, is that they do not adequately provide an arrangement for transporting circuit boards when the circuit boards have components disposed at the periphery of the board. Moreover, many of these arrangements do not permit circuit boards having different heights of components disposed thereon to be adequately shipped without redesign or providing additional packaging materials such as cushioning materials or spacers.

Another approach is described in U.S. Pat. No. 4,852,743. In this patent a reusable folder is described. The folder is comprised of a two sheets of plastic bonded to two sheets of fiberboard with each fiberboard sheet having a window cutout. The sheets of plastic form a hinge thereby allowing an article to be suspended between the plastic sheets disposed in the region of the pair of cutouts in the fiberboard. While this arrangement provides a technique for suspending a component in the package, one problem associated with this described folder is that the hinge portion provided by the plastic film and fiberboard sheet is relatively weak and is susceptible to damage, particularly if the folder is reused several times as is generally the intent in the above-described environments. Moreover, damage to the hinge may cause even more serious damage to the component which it is carrying should the hinge give way and the component fall through the bottom of the folder.

SUMMARY OF THE INVENTION

In accordance with the present invention, a packaging system includes a carton having slotted sidewall members disposed to receive suspension folders and at least one suspension folder. The suspension folder includes a layer of a packaging material having a pair of apertures and having a pair of creases disposed along a region of the layer coextensive with an edge portion of each one of the apertures and a stretchable material bonded to a first surface of said layer of packaging material, and means for hinging first and second portions of the layer of packaging material at portions of the layer disposed along the edges of the pair of apertures. With such an arrangement by hinging the first and second portions of the layer of packaging material at portions of the layer disposed along the edges of the pair of apertures an opportunity is provided to furnish the folder with a very strong hinge. This permits the folder to be more likely to be reused and minimizes potential damage to components it carries since it reduces the chance that the bottom of the folder will give out as in the prior art folders.

BRIEF DESCRIPTION OF THE DRAWINGS

The above-mentioned and other features of the invention will now become more apparent by reference to the following description taken in connection with the accompanying drawings, in which.

DESCRIPTION OF THE PREFERRED EMBODIMENT

Figure 1A:
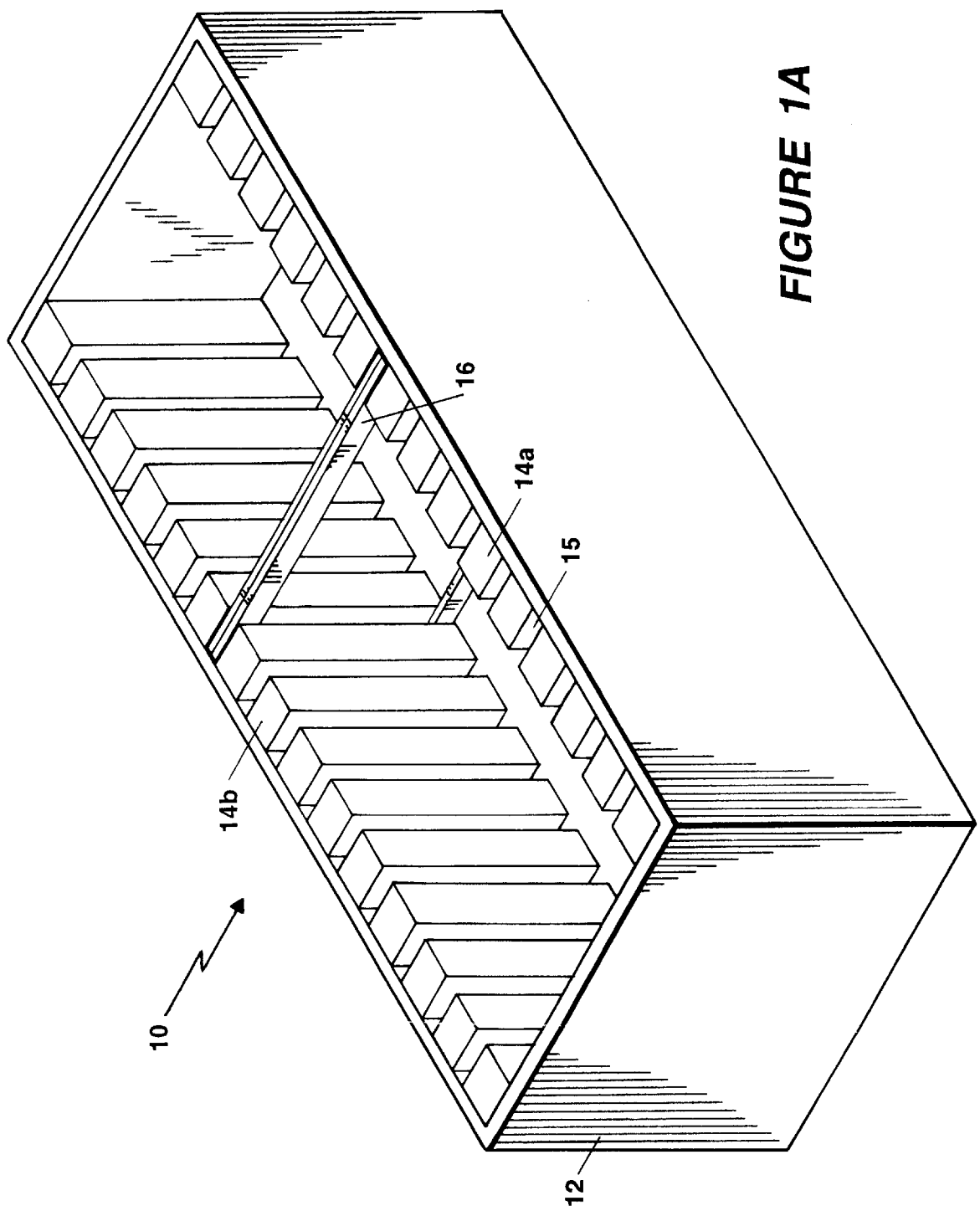
FIG. 1A is a perspective view of a shipping container having slots to receive mailing folders in accordance with the present invention.
Figure 1B:
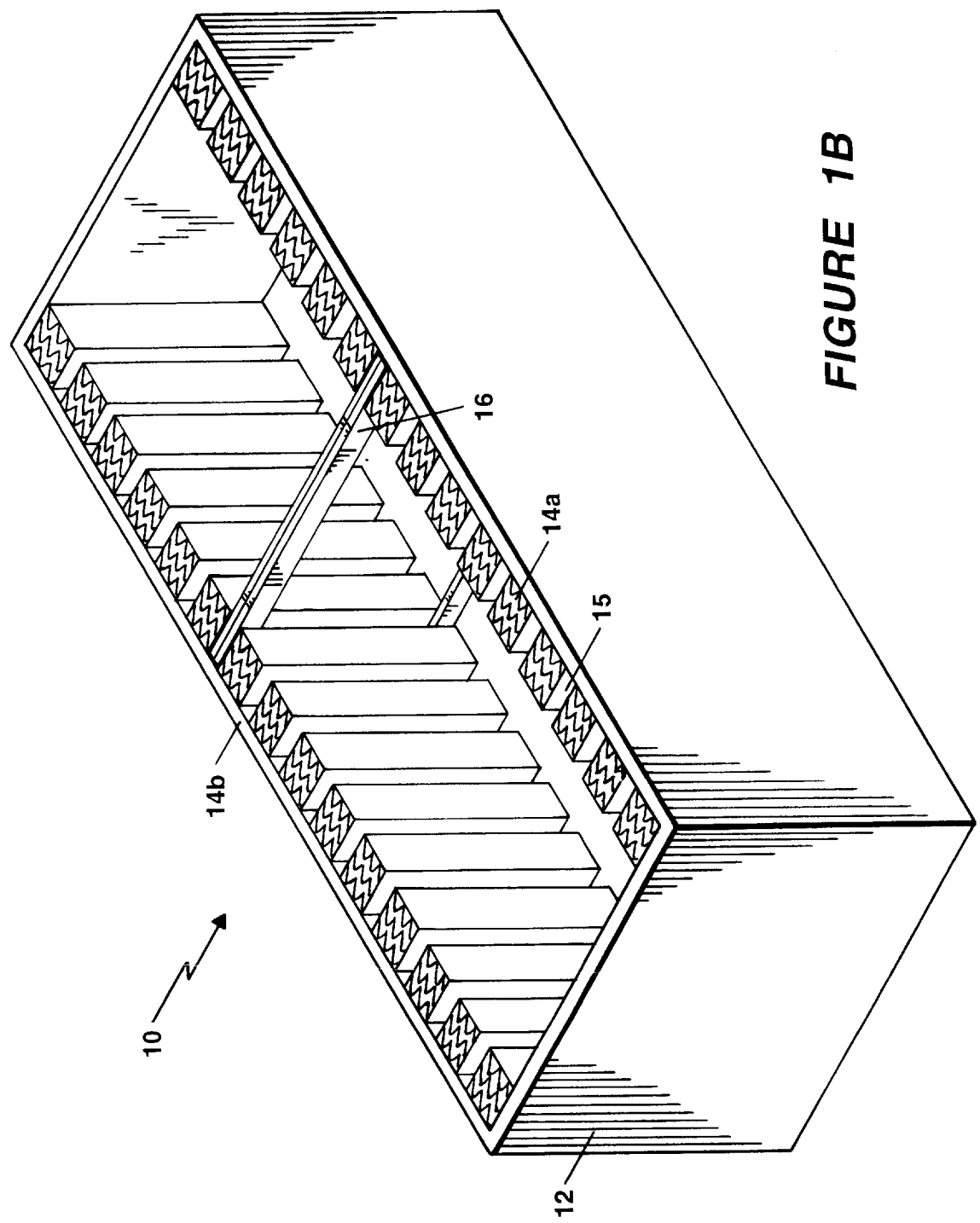
FIG. 1B is a perspective view of an alternative shipping container having slots in corrugated fiberboard to receive mailing folders in accordance with the present invention.

Referring now to FIG. 1A, a packaging system 10 is shown to include a carton 12 here a rectangular carton having slotted sidewall members 14a and 14b which are disposed to receive suspension folders 16 which are used to suspend electronic or other types of components therebetween as will be described. The slotted sidewalls 14b may be comprised of rolled-up corrugated slotted members (as shown in FIG. 1A), or slotted triple wall corrugated members (as shown in FIG. 1B) or other arrangements.

Figure 2:
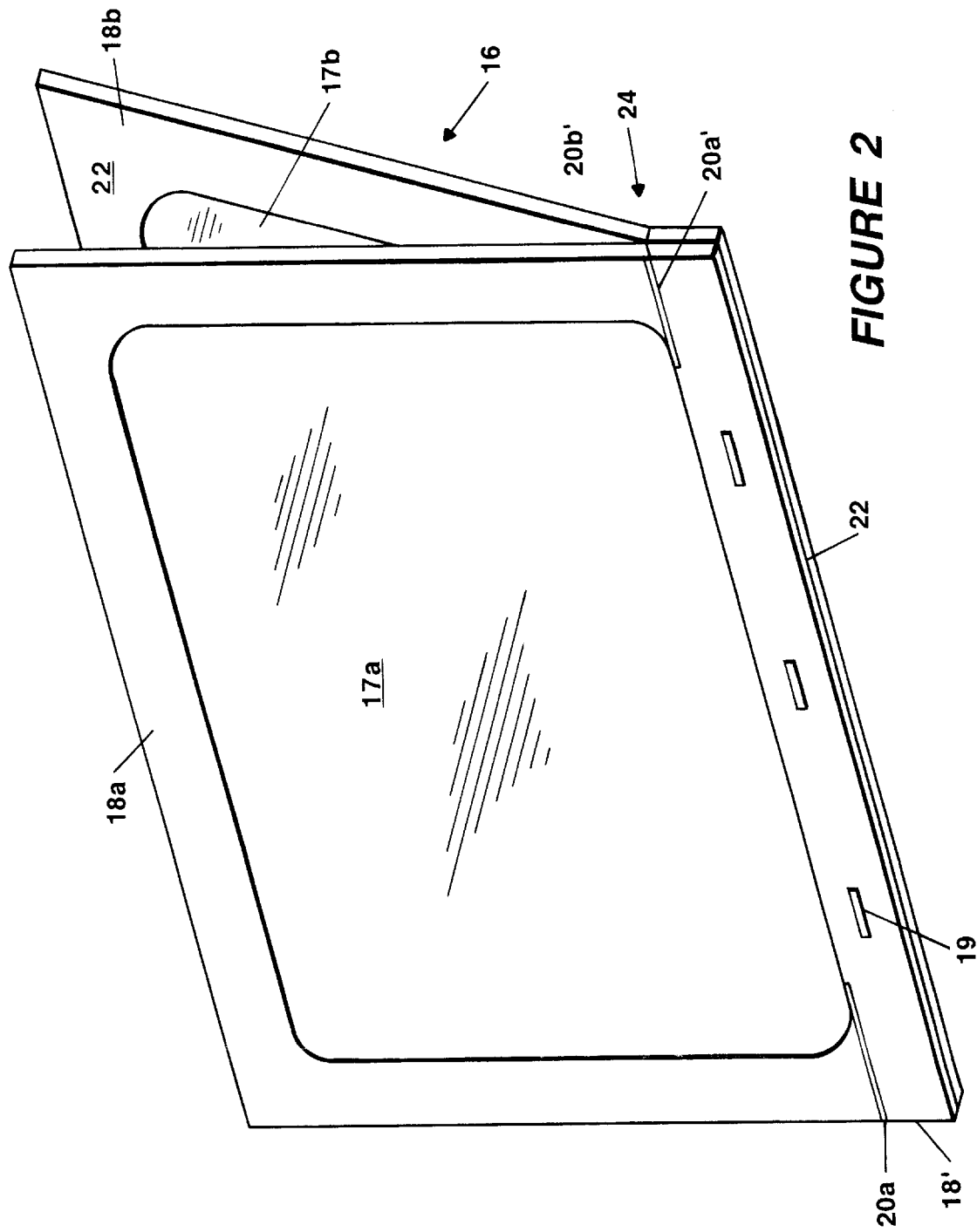
FIG. 2 is a perspective view of a packaging folder in accordance with the present invention.
Figure 4:
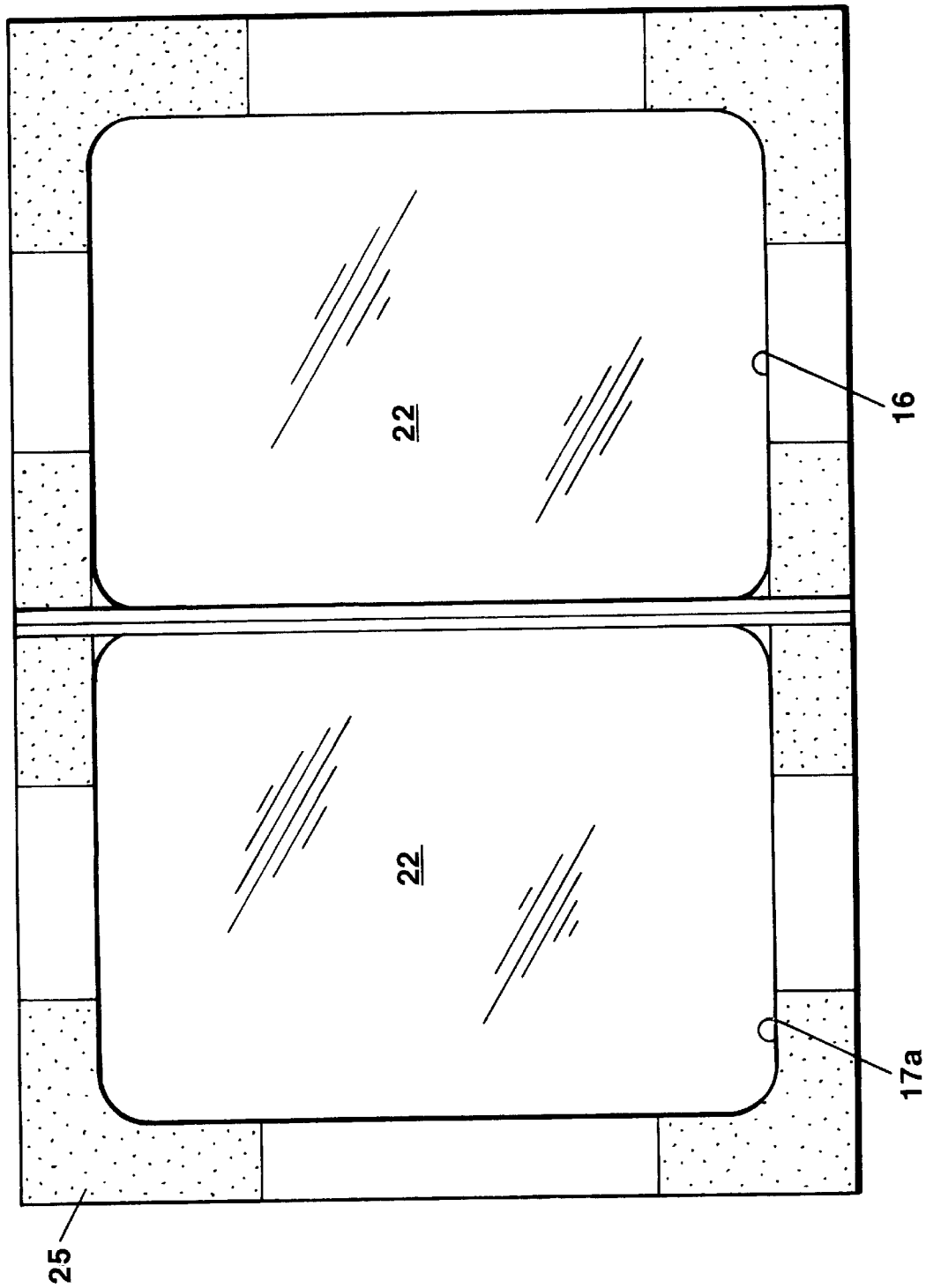
FIG. 4 is a plan view of the inner portion of folder of FIG. 2 showing selective bonded areas.
Figure 5:
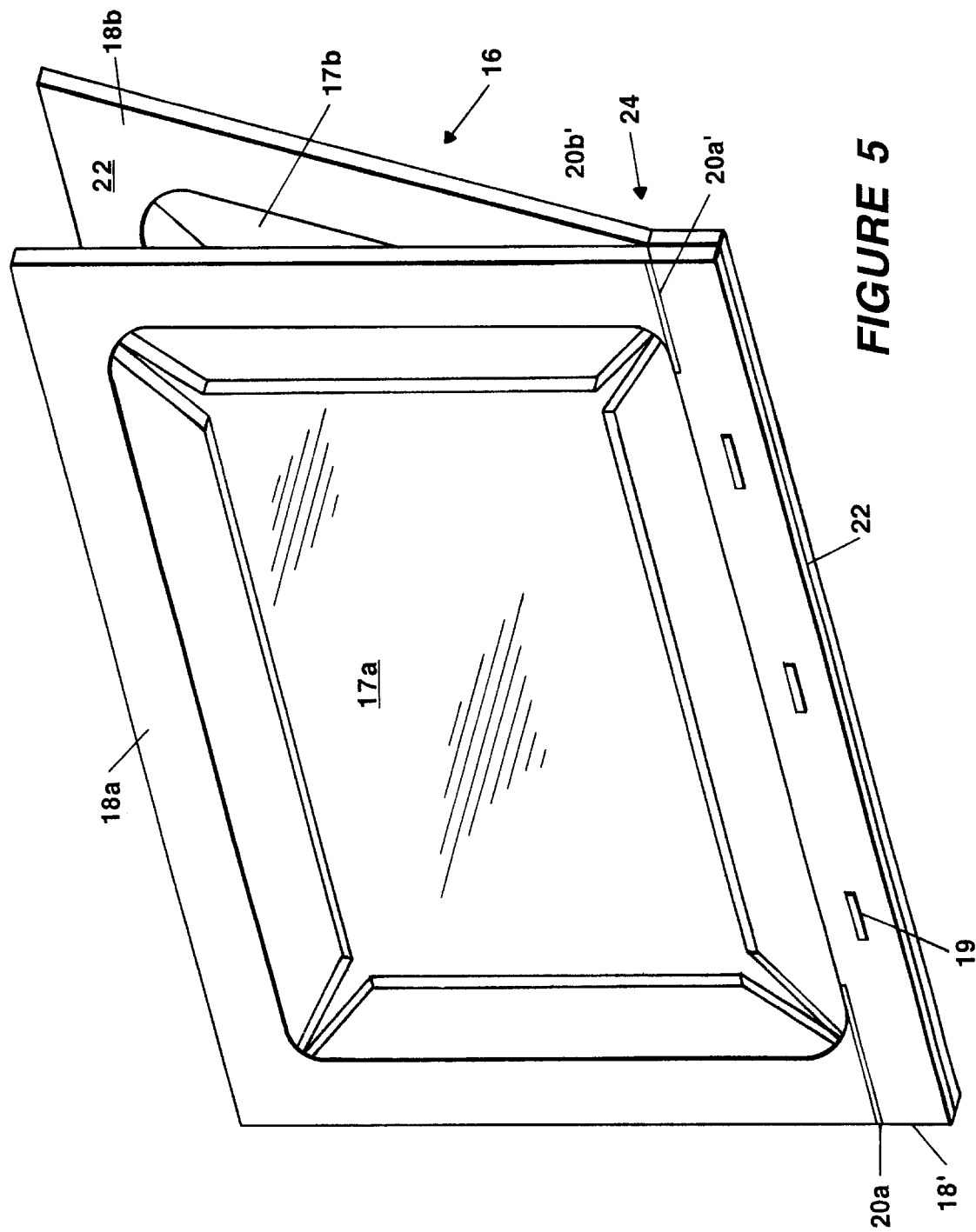
FIG. 5 is a perspective view of an alternative packaging folder having reenforcing doors in accordance with the present invention.

Referring now to FIG. 2, the suspension folder 16 is shown to include a pair of flaps 18a and 18b joined by a reinforced hinged portion 24. The flaps are comprised of fiberboard although other materials may alternatively be used. For example the flaps may be comprised of a rigid plastic. The flaps may be individual pieces of fiberboard which are joined or a piece of fiberboard scored at the centerline and folded to provide the pair of flaps 18a and 18b. Here the fiberboard is provided with an aperture or windows 17a, 17b in each of the flaps 18a, 18b as shown. Disposed over the inner surface of flaps 18a, 18b and covering windows 17a, 17b is a layer of a stretchable material such as a plastic film 22 which is either a single layer film or a pair of film layers which are bonded to the edges of flaps 18a and 18b. The film is here a plastic such as polyurethane. Alternatively, the film can be polyvinyl-chloride or other plastic types. Alternatively the film can be another web type of material rather than a film. The film or web is bonded to the fiberboard as is generally known in the packaging art. referred ways of bonding the plastic to the fiberboard are described in U.S. Pat. Nos. 4,852,743, 5,071,009 and 4,923,065. The film is selectively bonded (denoted by bonded areas 25) to the flaps as generally shown in conjuction with FIG. 4. The flaps can be reinforced by providing doors over the outside of the apertures to reinforce the material of the folder as shown in FIG. 5.

A score or crease is provided along a line coextensive with an edge of the respective windows 17*a*, 17*b*. These scores or creases 20*a*, 20*a*' and 20*b*' (crease 20*b*' not shown in FIG. 2), permit the flaps to pivot about the bottom portion of the folder and in combination with staples 19 disposed adjacent to the coextensive line portion of the window 17 provide a strong or reinforced hinged portion to the folder 16. The staples 19 are used to secure the bottom portions of the flaps 18*a* and 18*b*. Alternative means for securing include a bonding agent, such as a glue compatible with the plastic, as well as rivets, clips, double-sided tape, etc.

Figure 3:
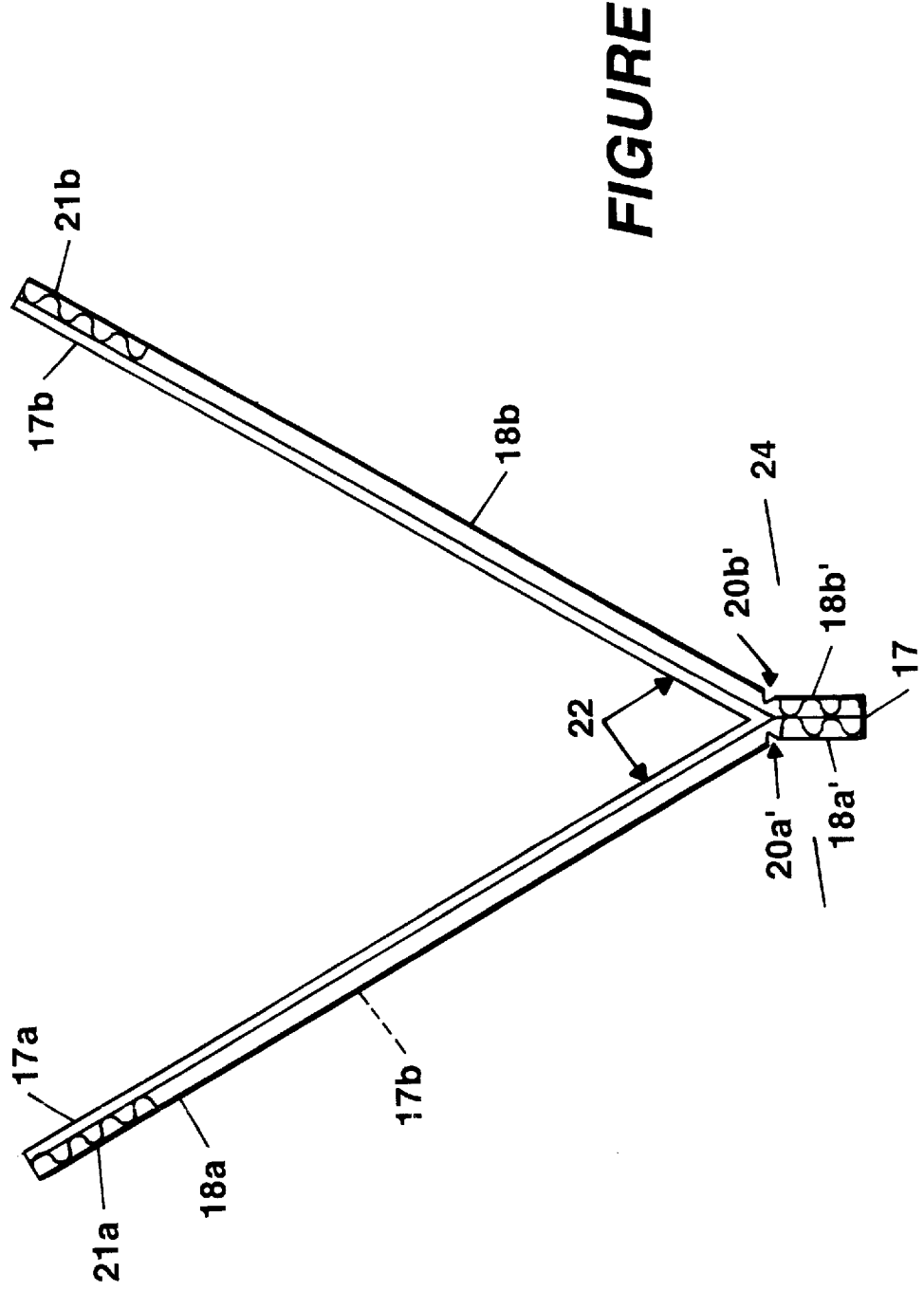
FIG. 3 is an end view of the packaging folder of FIG. 2 taken along line 3—3 of FIG. 2 showing details of construction of the packaging folder.

As shown in FIG. 3, the folder 16 has the layer of plastic film 22 disposed on the inside surfaces of the pair of flap members 18*a* and 18*b* with the flap members joined to form a strong reinforced hinged portion 24 along the bottom surface of the folder 16. This permits the packaging folder 16 to be suitable for packaging of high value components such as circuit boards while mitigating the possibility of the circuit boards dropping through the folders of the prior art.

Furthermore, by using the film or web material with the windows cutout in the folders, it permits electrical components having a wide variety of heights and shapes to be packaged within the folders and securely suspended during shipment in a shipping box such as shown in FIG. 1. For example, the slots in the box of FIG. 1 can be spaced at regular intervals. However, if certain components being shipped in the box are relatively thick compared to the slots in the box, slots can be skipped to accommodate for the thicknesses in components while, at the same time, ensuring the overall integrity of the shipping container. That is, the population of the slots does not significantly affect the overall shipping strength of the container which is determined principally by the construction of the box 12. Thus, the modified suspension pack folder including the improved hinge frame and window cutouts on each portion of the frame provides a low-cost and reusable package for shipping high value components which may have various shapes and thicknesses. The hinge on the frame reinforcing the bottom of the frame so that parts cannot fall out of the frame as the frame is removed from a box, for example, either by the film tearing or otherwise as would be common with the prior art approach.

By providing the plastic film or web material over the windows in the folder, the film or web can stretch and thus accommodate different thicknesses of components being shipped therein while at the same time suspending the component within the folder such that when the folder is removed from the pack the component is still retained in suspension within the folder. The shipping container is a full telescoping corrugated fiberboard half-slotted carton (HSC). While regular slotted cartons can alternatively be used, the full telescoping corrugated half-slotted carton does not have flaps that need to be cut to fit into flow racks. The cover for the HSC carton can be provided with hand holes in the middle of the width of the panels or with notches at the bottom edges to facilitate removal. The base can be nested into the cover to put into process flow racks. There is nothing on the cover that can be easily caught or torn. Two telescopic HSC styles, regular and auto-lock bottom, can be used. The auto-lock bottom type container is preferable since it in general requires no taping to set-up and pushing in at the opposite corners and pushing the inside flap down makes it ready for use. Pulling up the inside flap and pushing in on the length panel knocks it down. The auto-lock bottom HSC needs less space than regular HSCs to set up and knock down. Both telescopic carton styles can be sealed by strips of tape at the bottom which are easy to cut open. The full telescopic cover augments the carton's compression strength so less expensive material can be used without compromising the package's overall compression strength. The compression strength of the package is selected upon the load it must withstand when a maximum number of cartons are placed upon it during normal handling and shipment preparation. It is expected that the cover will need to be replaced more often than the base due to label, marking and abrasion damages. Otherwise, the packaging would be substantially reusable. Thus, by providing the folders which can be placed in the carton horizontally or vertically for the return for reuse transport an overall reusable shipping system 10 is provided.

Having described preferred embodiments of the invention, it will now become apparent to those of skill in the art that other embodiments incorporating its concept may be used. Accordingly, it is felt that the invention should not be limited to the disclosed embodiments, but rather should be limited only by the spirit and scope of the appended claims.

What is claimed is:

1. A suspension folder comprising:

a layer of a packaging material having a pair of apertures and having a pair of creases disposed along a region of the layer coextensive with an edge portion of each one of the apertures;

a stretchable material bonded to a first surface of said layer of packaging material; and means for hinging first and second portions of the layer of packaging material at portions of the layer disposed along said edge portion of the pair of apertures.

2. The folder of claim 1 wherein said means for hinging comprises:

means for securing at portions of the layer disposed along the edge portion of the pair of apertures the first and second portions of the layer together; and the pair of creases of the first and second portions of the layer of packaging material disposed along a line coextensive with the apertures in said first and second portions of the layer of packaging material.

3. The folder of claim 2 wherein said stretchable material is a web material.

4. The folder of claim 3 wherein said means for securing comprise staples disposed through the first and second portions of the layer.

5. A packaging folder comprising:

a first layer of a packaging material having an aperture and having a pair of creases disposed along a region of the first layer coextensive with an edge portion of the aperture in the first layer;

a second layer of a packaging material having an aperture and having a pair of creases disposed along a region of the first layer coextensive with an edge portion of the aperture in the second layer;

a stretchable material bonded to first surfaces of said first and second layers of packaging material; and means for hinging portions of the first and second layers of packaging material at portions of the first and second layers along regions of the respective apertures.

6. The folder of claim 5 wherein said means comprises:

means for securing the first and second layers of packaging material together; and the pair of creases of the first and second layers of packaging material disposed along a line coextensive with the apertures in said first and second layers of packaging material.

7. The folder of claim 6 wherein said stretchable material is a web material.

8. The folder of claim 7 wherein said means for securing comprise staples disposed through the first and second portions of the layer.

9. The folder of claim 6 wherein said means for securing comprise staples disposed through the first and second portions of the layer.

10. A packaging system comprising:
   a carton having slotted sidewall members disposed to receive suspension folders; and
   at least one suspension folder comprising:
      a layer of a packaging material having a pair of apertures and having a pair of creases disposed along a region of the layer coextensive with an edge portion of each one of the apertures;
      a stretchable material bonded to a first surface of said layer of packaging material; and
      means for hinging first and second portions of the layer of packaging material at portions of the layer disposed along the edge portion of the pair of apertures.

11. The packaging system of claim 10 wherein said means comprises:
   means for securing the first and second portions of the layer of packaging material together; and
   the pair of creases of the first and second portions disposed along a line coextensive with the apertures in said first and second portions of the layer.

12. The packaging system of claim 11 wherein said stretchable material is a web material.

13. The packaging system of claim 12 wherein said means for securing comprise staples disposed through the first and second portions of the layer.

14. The packaging system of claim 11 wherein the sidewall members of said carton are rolled-up corrugated slotted members or slotted triple wall corrugated members.

* * * * *